(No Model.)

J. L. STEVENS.
NUT LOCK.

No. 258,497. Patented May 23, 1882.

Witnesses.
Edwin L. Yewell.
J. J. McCarthy.

Inventor.
John L. Stevens,
By C. M. Alexander
his Attorney.

UNITED STATES PATENT OFFICE.

JOHN L. STEVENS, OF CHICAGO, ILLINOIS, ASSIGNOR, BY DIRECT AND MESNE ASSIGNMENTS, OF THREE-FOURTHS TO GEORGE A. SMITH AND EDWARD HEMPSTEAD, BOTH OF SAME PLACE.

NUT-LOCK.

SPECIFICATION forming part of Letters Patent No. 258,497, dated May 23, 1882.

Application filed January 21, 1882. (No model.)

*To all whom it may concern:*

Be it known that I, JOHN L. STEVENS, of Chicago, in the county of Cook, and in the State of Illinois, have invented certain new and useful Improvements in Lock-Nuts for Bolts; and I do hereby declare that the following is a full, clear, and exact description thereof, reference being had to the accompanying drawings, and to the letters of reference marked thereon, making a part of this specification.

This invention relates to certain improvements in lock-nuts for bolts; and it has for its object to provide a device that can be cheaply constructed and readily applied and secured to the bolt against the nut, whereby the same is prevented from working loose, as more fully hereinafter specified. These objects I accomplish by the devices illustrated in the accompanying drawings, in which—

Figure 1:
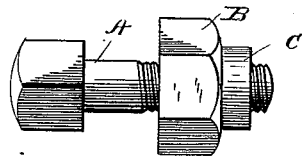
Figure 2:
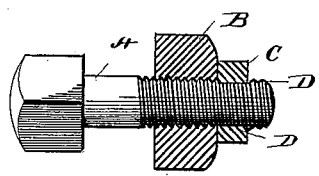
Figure 3:
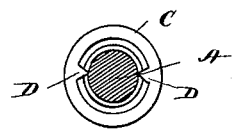
Figure 4:
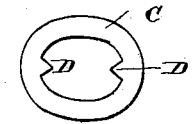

Figure 1 represents a side elevation of my improved nut-lock applied to a bolt in position to hold the nut. Fig. 2 represents a view of the bolt, showing the nut and nut-lock in section secured thereon. Fig. 3 indicates an end view of the bolt, showing the nut-lock secured thereon; and Fig. 4 represents a detached view of the nut-lock.

The letter A indicates a screw-bolt, and B a screw-nut of the ordinary description, and C the improved nut-lock. This consists of an oval ring of malleable metal, provided on the inside with angular projections D, as clearly indicated in Fig. 4 of the drawings. The said ring is of such size as to be slipped over the end of the bolt after the nut is applied, when the ring is secured by compressing the ring in the direction of its greatest diameter, so as to cause the projections to bite into the threads, or the threads and projections to bite mutually, and thus secure the ring to the bolt and lock the nut in place. As the metal of the nut-lock possesses no elasticity whatever it is impossible for it, under any circumstances, to spring out of place after being once fastened to the bolt. Moreover, the nut-lock, being of such size as to be readily slipped upon the bolt, requires no peculiar tool for application to the bolt, and can be compressed thereon by means of an ordinary pair of pliers or other simple tool.

I am aware that a grooved bolt provided with a recessed nut and ribbed collar having springs to engage the recesses in the nut have heretofore been employed, the ribbed collar, in connection with the springs, serving to lock the nut; but such I do not claim.

Having thus described my invention, what I claim, and desire to secure by Letters Patent, is—

The herein-described nut-lock, consisting of an oval ring of metal provided with projections on the inside and adapted to be slipped upon the bolt and secured thereon by compression, causing the projections to bite the threads, or the projections and threads to mutually bite, substantially as set forth.

In testimony whereof I affix my signature, in presence of two witnesses, this 27th day of December, 1881.

JOHN L. STEVENS.

Witnesses:
T. H. BRYANT,
G. A. SMITH.